(12) United States Patent
Kurokawa et al.

(10) Patent No.: US 9,262,970 B2
(45) Date of Patent: Feb. 16, 2016

(54) DISPLAY DEVICE AND ELECTRONIC APPARATUS

(71) Applicant: Japan Display Inc., Tokyo (JP)

(72) Inventors: Tae Kurokawa, Tokyo (JP); Akira Sakaigawa, Tokyo (JP); Masaaki Kabe, Tokyo (JP); Masashi Mitsui, Tokyo (JP); Kojiro Ikeda, Tokyo (JP); Fumitaka Goto, Tokyo (JP); Amane Higashi, Tokyo (JP); Hirokazu Tatsuno, Tokyo (JP); Toshiyuki Nagatsuma, Tokyo (JP); Hiroki Uchiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/223,306

(22) Filed: Mar. 24, 2014

(65) Prior Publication Data

US 2014/0285539 A1    Sep. 25, 2014

(30) Foreign Application Priority Data

Mar. 25, 2013  (JP) ................ 2013-062503

(51) Int. Cl.
```
G09G 3/36      (2006.01)
G09G 3/34      (2006.01)
G06F 1/32      (2006.01)
```

(52) U.S. Cl.
CPC ............ *G09G 3/3406* (2013.01); *G06F 1/32* (2013.01); *G06F 1/3265* (2013.01); *G09G 3/3607* (2013.01); *G09G 3/3648* (2013.01);*G09G2320/0242* (2013.01); *G09G 2320/0646* (2013.01); *G09G 2340/06* (2013.01); *Y02B 60/1242* (2013.01)

(58) Field of Classification Search
CPC . G09G 3/3607; G09G 3/2003; G09G 3/3406; G09G 3/3413; G09G 2300/0452; G09G 2300/0478
USPC ...................... 345/87, 98, 102, 690
See application file for complete search history.

(56) References Cited

U.S. PATENT DOCUMENTS

| | | | |
|---|---|---|---|
| 2010/0259556 A1* | 10/2010 | Inuzuka | 345/604 |
| 2012/0026211 A1* | 2/2012 | Kikuchi et al. | 345/690 |
| 2013/0176498 A1* | 7/2013 | Noutoshi et al. | 348/712 |

FOREIGN PATENT DOCUMENTS

| | | |
|---|---|---|
| JP | 2010-156817 | 7/2010 |
| JP | 2014-155024 | 8/2014 |

OTHER PUBLICATIONS

Japanese Patent Office Action for Application No. 2013-062503 dated Sep. 1, 2015 (6 pages).

*Primary Examiner* — Jennifer Nguyen
(74) *Attorney, Agent, or Firm* — Michael Best & Friedrich LLP (57) ABSTRACT

According to an aspect, a display device includes: an image display panel; a color conversion device including a signal processing unit and a signal output unit; a planar light-source device; and a light-source-device control unit. The signal processing unit includes a color conversion circuit that converts an input signal in a reference color area into a converted input signal generated in a definition color area where a chromaticity point of at least one of a first color, a second color, and a third color is inside of a reference color area, and a four-color generation circuit that generates an output signal and a light-source-device control signal from the converted input signal. The signal output unit outputs the drive signal to each sub-pixel based on the output signal. The light-source-device control unit outputs a drive voltage for emitting white light on the planar light-source device based on the light-source-device control signal.

4 Claims, 8 Drawing Sheets

DISPLAY DEVICE AND ELECTRONIC APPARATUS

CROSS-REFERENCE TO RELATED APPLICATIONS

This application claims priority from Japanese Application No. 2013-062503, filed on Mar. 25, 2013, the contents of which are incorporated by reference herein in its entirety.

BACKGROUND

1. Technical Field

The present disclosure relates to a display device that displays an image and an electronic apparatus.

2. Description of the Related Art

There has been conventionally employed a liquid-crystal display device that uses an RGBW-method liquid-crystal panel in which a pixel W (white) is added to pixels R (red), G (green), and B (blue). This RGBW-method liquid-crystal display device displays an image by allocating the transmission amount of light from a backlight in the pixels R, G, and B also to the pixel W, where the transmission amount is based on RGB data that determines image display. This makes it possible to reduce the luminance of the backlight, thereby reducing power consumption.

Japanese Patent Application Laid-open Publication No. 2010-156817 (JP-A-2010-156817) describes a transmissive liquid-crystal display device that includes a liquid-crystal panel in which one pixel is divided into four sub-pixels of red (R), green (G), blue (B), and white (W), a white backlight that is capable of controlling the light-emission luminance, and a saturation-luminance simultaneously-reducing unit that performs saturation-luminance reduction processing for reducing both or either one of saturation and luminance on pixel data included in an input RGB signal that is an input image to convert the input RGB signal into an RGB signal after simultaneous reduction of saturation and luminance, wherein when both the saturation and the luminance are reduced, while maintaining hue, the saturation-luminance simultaneously-reducing unit calculates the RGB signal after simultaneous reduction of saturation and luminance, by using a saturation-luminance reduction ratio that is a parameter for adjusting the reduction ratio between the saturation and the luminance so as to prevent only the saturation from becoming 0, and the above saturation-luminance reduction ratio is calculated according to each pixel.

However, because the liquid-crystal display device described in JP-A-2010-156817 performs processing for reducing both or either one of saturation and luminance on an image signal, the display quality is degraded.

For the foregoing reasons, there is a need for a display device and an electronic apparatus that can reduce power consumption, while suppressing degradation of image quality.

SUMMARY

According to an aspect, a display device includes: an image display panel in which pixels are arrayed in a two-dimensional matrix, where each of the pixels includes a first sub-pixel that displays a first color, a second sub-pixel that displays a second color, a third sub-pixel that displays a third color, and a fourth sub-pixel that displays white; a color conversion device that includes a signal processing unit that generates an output signal for controlling an operation of a pixel of a display unit based on an input signal generated in a reference color area, and a signal output unit that outputs a drive signal of the pixel to the image display panel based on the output signal generated by the signal processing unit; a planar light-source device that is arranged at a backside of the display unit at an opposite side to an image display surface thereof, and that emits white light toward a substantially entire surface of the display unit; and a light-source-device control unit that controls the planar light-source device. The signal processing unit includes a color conversion circuit that converts the input signal in the reference color area into a converted input signal generated in a definition color area where a chromaticity point of at least one of the first color, the second color, and the third color is inside of the reference color area, and a four-color generation circuit that generates the output signal and a light-source-device control signal from the converted input signal converted by the color conversion circuit. The signal output unit outputs the drive signal to the first sub-pixel, the second sub-pixel, the third sub-pixel, and the fourth sub-pixel based on the output signal generated by the four-color generation circuit. The light-source-device control unit outputs a drive voltage for emitting the white light on the planar light-source device based on the light-source-device control signal generated by the four-color generation circuit.

According to another aspect, an electronic apparatus includes: the display device; and a control device that transmits the input signal for displaying an image to the display device.

DETAILED DESCRIPTION

An example of implementing the present disclosure will be explained below in detail with reference to the accompanying drawings. Explanations are made in the following order.
1. Embodiment (Display device and driving method of display device)
   One pixel includes a white sub-pixel
   Color area setting, and color conversion based on set color area
2. Application example (Electronic apparatus)
   Example in which a display device according to the above embodiment is applied to an electronic apparatus
3. Aspects of the present disclosure

1. Embodiment

1-1. Configuration of Liquid-Crystal Display Device 10

Figure 1:
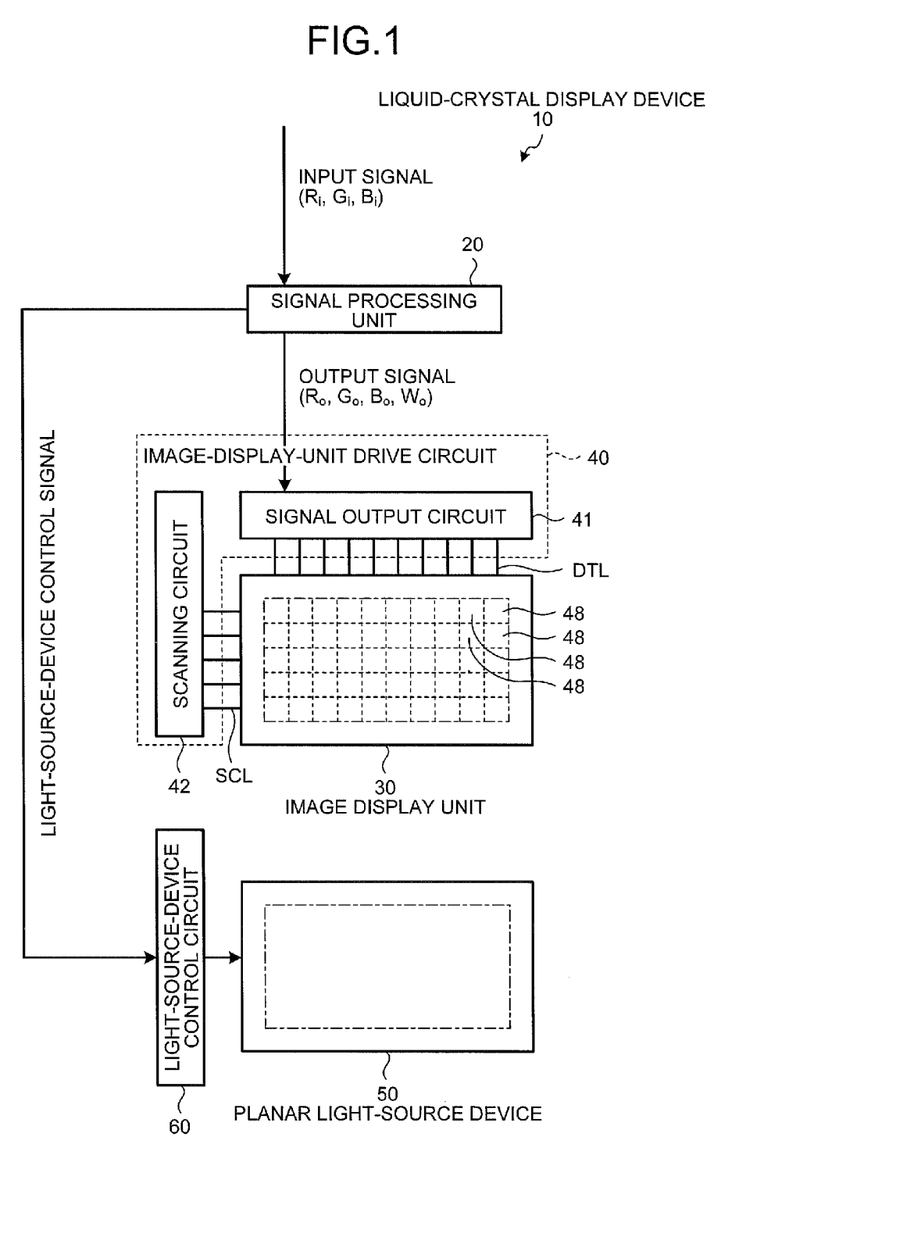
FIG. 1 is a block diagram of a configuration example of a liquid-crystal display device according to an embodiment of the present disclosure.
Figure 2:
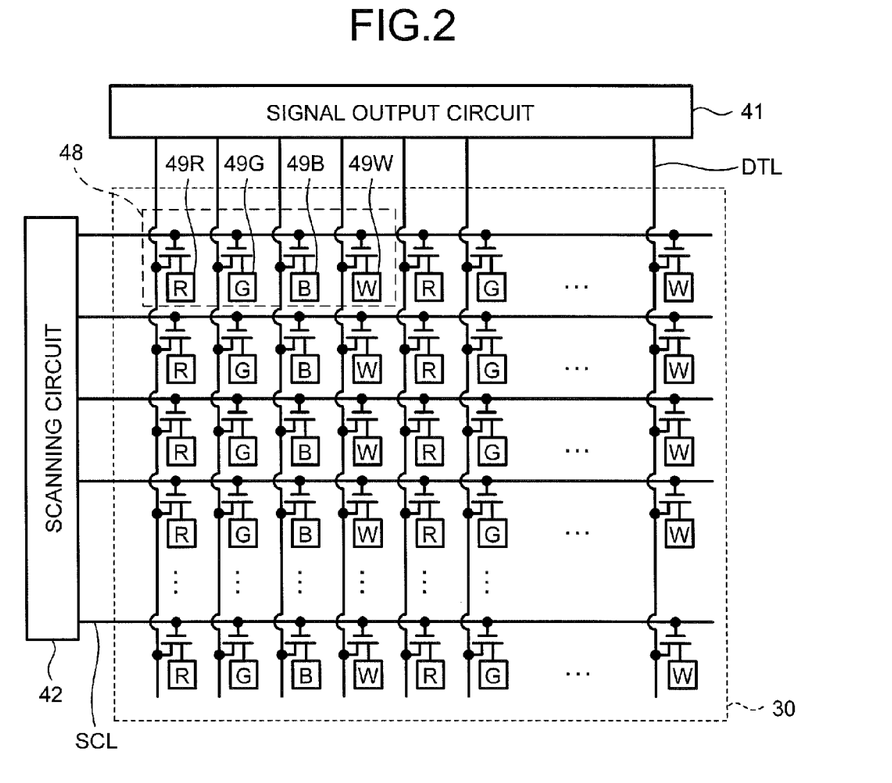
FIG. 2 is a wiring diagram of an image display unit and an image-display-unit drive circuit in the liquid-crystal display device in FIG. 1.

FIG. 1 is a block diagram of a configuration example of a liquid-crystal display device according to an embodiment of the present disclosure. FIG. 2 is a wiring diagram of an image display unit and an image-display-unit drive circuit in the liquid-crystal display device in FIG. 1. With reference to FIGS. 1 and 2, a configuration of a liquid-crystal display device 10 according to the embodiment is explained. In the embodiment, the liquid-crystal display device 10 using a liquid crystal is explained as an example of a display device. However, the display device is not limited thereto.

As illustrated in FIG. 1, the liquid-crystal display device 10 according to the embodiment includes a signal processing unit 20 that receives an input signal (RGB data), and that performs predetermined data conversion processing on the input signal to output an output signal, an image display unit 30 that displays an image based on the output signal output from the signal processing unit 20, an image-display-unit drive circuit 40 that controls a display operation of the image display unit 30, a planar light-source device 50 that emits white light in a planner manner to the image display unit 30 from the backside thereof, and a light-source-device control circuit (light-source-device control unit) 60 that controls an operation of the planar light-source device 50. The liquid-crystal display device 10 has the same configuration as an image display device assembly described in Japanese Patent Application Laid-open Publication No. 2011-154323 (JP-A-2011-154323), and various modifications described in JP-A-2011-154323 are applicable to the liquid-crystal display device 10.

The signal processing unit 20 is an arithmetic processing unit that controls an operation of each of the image display unit 30 and the planar light-source device 50. The signal processing unit 20 is electrically coupled to the image-display-unit drive circuit 40 that drives the image display unit 30 and to the light-source-device control circuit 60 that drives the planar light-source device 50. The signal processing unit 20 performs data processing on an input signal (RGB data) that is externally input to generate and output an output signal and a light-source-device control signal. Specifically, the signal processing unit 20 performs predetermined color conversion processing on an input signal (Ri, Gi, and Bi) that is RGB data represented by an energy ratio between R (red), G (green), and B (blue), as described later, and further generates an output signal (Ro, Go, Bo, and Wo) represented by an energy ratio between R (red), G (green), B (blue), and W (white) in which W (white) that is a fourth color is added to RGB. The signal processing unit 20 then outputs the generated output signal (Ro, Go, Bo, and Wo) to the image-display-unit drive circuit 40, and outputs the light-source-device control signal to the light-source-device control circuit 60. The input signal (Ri, Gi, and Bi) is RGB data that represents a specific color in a reference color area. Various standards applicable to image display can be used for the reference color area. For example, there are the sRGB standard color area, the Adobe (registered trademark) RGB standard color area, and the NTSC standard color area. The sRGB standard is a standard defined by the IEC (the International Electrotechnical Commission). The Adobe (registered trademark) RGB standard is a standard defined by Adobe Systems. The NTSC standard is a standard defined by the National Television System Committee.

The image display unit 30 is a color liquid-crystal display unit in which pixels 48 are arrayed in a two-dimensional matrix, where each of the pixels 48 includes a first sub-pixel 49R that displays a first color (red), a second sub-pixel 49G that displays a second color (green), a third sub-pixel 49B that displays a third color (blue), and a fourth sub-pixel 49W that displays a fourth color (white) as illustrated in FIG. 2. A first color filter that transmits light of the first color (red) is arranged between the first sub-pixel 49R and the display surface of the image display unit 30. A second color filter that transmits light of the second color (green) is arranged between the second sub-pixel 49G and the display surface of the image display unit 30. A third color filter that transmits light of the third color (blue) is arranged between the third sub-pixel 49B and the display surface of the image display unit 30. A transparent resin layer that transmits all colors is arranged between the fourth sub-pixel 49W and the display surface of the image display unit 30. A configuration, in which a transparent resin layer or any other layer is not provided between the fourth sub-pixel 49W and the display surface of the image display unit 30, can also be employed.

In an example illustrated in FIG. 2, in the image display unit 30, the first sub-pixel 49R, the second sub-pixel 49G, the third sub-pixel 49B, and the fourth sub-pixel 49W are arranged in an array similar to a stripe array. The configuration and arrangement of sub-pixels included in one pixel are not particularly limited. For example, in the image display unit 30, the first sub-pixel 49R, the second sub-pixel 49G, the third sub-pixel 49B, and the fourth sub-pixel 49W can also be arranged in an array similar to a diagonal array (a mosaic array). For another example, these pixels can be arranged in an array similar to a delta array (a triangle array) or an array similar to a rectangle array. Generally, the array similar to the stripe array is preferable for personal computers and the like to display data and text. In contrast thereto, the array similar to the mosaic array is preferable for video camera recorders, digital still cameras, and the like to display natural images.

The image-display-unit drive circuit 40 includes a signal output circuit 41 (signal output unit) and a scanning circuit 42. As illustrated in FIG. 2, the signal output circuit 41 is electrically coupled by a wiring DTL to each sub-pixel of the pixel 48 in the image display unit 30. Based on the output signal (Ro, Go, Bo, and Wo) output from the signal processing unit 20, the signal output circuit 41 outputs a drive voltage to be applied to a liquid crystal included in each sub-pixel, and controls the transmission rate of light emitted from the planar light-source device 50 in each pixel. As illustrated in FIG. 2, the scanning circuit 42 is electrically coupled by a wiring SCL to each switching element that controls an operation of each sub-pixel of the pixel 48 in the image display unit 30. The scanning circuit 42 sequentially outputs a scanning signal to a plurality of wirings SCL, and applies the scanning signal to the switching element of the sub-pixel of the pixel 48 to turn the switching element ON for operation. The signal output circuit 41 applies a drive voltage to a liquid crystal included in a sub-pixel that has been applied with the scanning signal of the scanning circuit 42. In this manner, an image is displayed on the entire screen of the image display unit 30.

The planar light-source device 50 is arranged on the backside of the image display unit 30 on the opposite side to its image display surface, and emits the white light toward the substantially entire surface of the image display unit 30.

Based on the light-source-device control signal output from the signal processing unit 20, the light-source-device control circuit 60 outputs a drive voltage for making the planar light-source device 50 emit the white light, thus controls the light amount (the light intensity).

1-2. Structure of Image Display Unit 30

Figure 3:
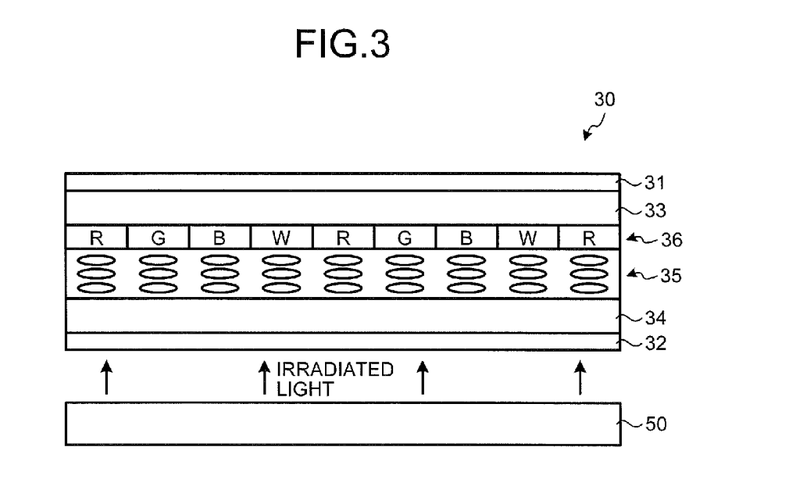
FIG. 3 is a schematic cross-sectional view of the image display unit in the liquid-crystal display device in FIG. 1.

FIG. 3 is a schematic cross-sectional view of an image display unit in a liquid-crystal display device in FIG. 1. With reference to FIG. 3, a structure of the image display unit 30 according to the embodiment is explained. As illustrated in FIG. 3, the image display unit 30 in the liquid-crystal display device 10 according to the embodiment includes a pair of transparent substrates 33 and 34, a liquid crystal layer 35 that is arranged between the pair of transparent substrates 33 and 34, polarizing plates 31 and 32 that are respectively arranged outside of the pair of transparent substrates 33 and 34, and a color filter 36 that is arranged between the transparent substrate 33 and the liquid crystal layer 35. The polarizing plates 31 and 32 control transmission of light emitted from the planar light-source device 50. Although not illustrated in FIG. 3, an electrode that applies a voltage to a liquid crystal in the liquid crystal layer 35, the wirings DTL and SCL, and a switching element that controls an operation of each sub-pixel of the pixel 48 are mounted on the transparent substrates 33 and 34. The transparent substrates 33 and 34 have a function of preventing electricity in the electrode from leaking to other portions.

The liquid crystal layer 35 adjusts the light transmission rate according to the magnitude of an applied voltage, and uses various liquid-crystal modes such as TN (twisted nematic) mode, VA (vertical alignment) mode, and ECB (electrically controlled birefringence) mode. In this case, the electrode that applies a voltage to the liquid crystal in the liquid crystal layer 35 is formed on each of the transparent substrates 33 and 34. As the liquid crystal layer 35, a liquid crystal in a lateral electric-field mode such as FFS (fringe field switching) mode and IPS (in-plane switching) mode can also be used. In this case, electrodes (a pixel electrode and a common electrode) that apply a voltage to the liquid crystal in the liquid crystal layer 35 are formed on the transparent substrate 33.

The color filter 36 is provided between the liquid crystal layer 35 and the transparent substrate 33 arranged on the image display side, and is configured, for example, by periodically arraying three R (red), G (green), and B (blue) color filter layers (the first color filter, the second color filter, and the third color filter that are described above) and a transparent resin layer (W (white)) that transmits all colors.

Although not illustrated in FIG. 3, respective alignment films are provided between the transparent substrate 34 and the liquid crystal layer 35, and between the liquid crystal layer 35 and the color filter 36. The alignment film has a function of arranging liquid crystal molecules of the liquid crystal layer 35 in a given direction.

1-3. Configuration of Signal Processing Unit 20

Figure 4:
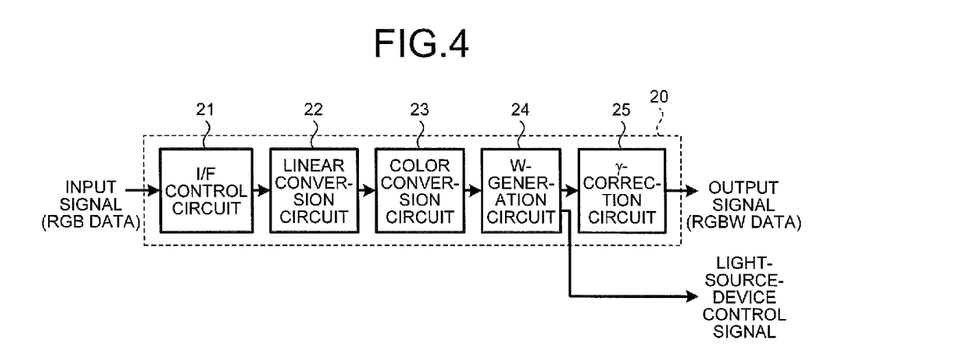
FIG. 4 is a block diagram of a signal processing unit in the liquid-crystal display device in FIG. 1.

FIG. 4 is a block diagram of a signal processing unit in the liquid-crystal display device in FIG. 1. With reference to FIG. 4, a configuration of the signal processing unit 20 according to the embodiment is explained. As illustrated in FIG. 4, the signal processing unit 20 in the liquid-crystal display device 10 according to the embodiment includes an I/F control circuit 21, a linear conversion circuit 22 (a linear conversion unit), a color conversion circuit 23, a W-generation circuit 24 (a four-color generation unit), and a γ (gamma)-correction circuit 25 (a γ-correction unit).

The I/F control circuit 21 is an interface that has an input signal (Rin, Gin, and Bin), which is image information (RGB data), externally input thereto. Specifically, the I/F control circuit 21 converts the input signal (Rin, Gin, and Bin) that is externally input into a signal in a data format appropriate to performing data processing in the linear conversion circuit 22, the color conversion circuit 23, the W-generation circuit 24, and the γ-correction circuit 25, and outputs the converted signal to the linear conversion circuit 22.

The linear conversion circuit 22 performs linear conversion that is inverse γ-correction on the input signal (Rin, Gin, and Bin) received through the I/F control circuit 21. Specifically, the linear conversion circuit 22 converts the input signal (Ri, Gi, and Bi), which has undergone γ-correction using a γ value larger than 1 (for example, γ=2.2), into RGB data in which the γ value is 1 (the inverse γ-correction). For example, in a case where the input signal (Rin, Gin, and Bin) is RGB data represented by 8 bits (0 to 255), the linear conversion circuit 22 normalizes the RGB data such that respective values of an R-component, a G-component, and a B-component of the RGB data become equal to or larger than 0 and equal to or smaller than 1, and outputs the normalized RGB data to the color conversion circuit 23. As described above, the RGB data normalization processing is not necessarily required, and the data which has undergone the inverse γ-correction can be directly output to the color conversion circuit 23.

The color conversion circuit 23 performs color conversion processing on the normalized RGB data (an RGB input signal) received from the linear conversion circuit 22, and outputs color-converted RGB data (an RGB converted input signal) (Rout, Gout, and Bout) to the W-generation circuit 24. Specifically, as expressed by the following equation 1, the input signal (Rin, Gin, and Bin) is multiplied by a color conversion matrix (a 3×3 conversion matrix), and is converted into the RGB converted input signal (Rout, Gout, and Bout). The color conversion is described later.

$$\begin{pmatrix} Rout \\ Gout \\ Bout \end{pmatrix} = \begin{pmatrix} RR & GR & BR \\ RG & GG & BG \\ RB & GB & BB \end{pmatrix} \times \begin{pmatrix} Rin \\ Gin \\ Bin \end{pmatrix} \qquad (1)$$

Based on the RGB data (the converted input signal) received from the color conversion circuit 23, the W-generation circuit 24 generates RGBW data including data of a W (white)-component for driving the fourth sub-pixel 49W of the pixel 48, and also generates the light-source-device control signal. It is possible to realize the processing for generating the RGBW data based on the RGB data and processing for generating the light-source-device control signal by the W-generation circuit 24 by using a known method described in Japanese Patent Application Laid-open Publication No. 2008-176247, JP-A-2010-156817, and the like. The W-generation circuit 24 outputs the generated RGBW data to the γ-correction circuit 25.

As described above, in the case where the input signal (Rin, Gin, and Bin) and the converted input signal (Rout, Gout, and Bout) are RGB data represented by 8 bits (0 to 255) for example, the γ-correction circuit 25 converts the RGBW data received from the W-generation circuit 24 into 8-bit data in the same way as the input signal and the converted input signal. Further, the γ-correction circuit 25 performs the γ-correction processing on the converted 8-bit data, using the γ value (for example, γ=2.2) of the input signal having undergone the γ-correction, and outputs γ-corrected RGBW data as the output signal (Ro, Go, Bo, and Wo). The γ-correction circuit 25 converts the RGBW data into 8-bit data in the same way as the input signal. However, the bit-number of the RGBW data does not necessarily correspond with that of the input signal particularly.

The signal processing unit 20 converts the input signal (Rin, Gin, and Bin) into the output signal (Ro, Go, Bo, and Wo), and therefore can allocate the transmission amount of light from the planar light-source device 50 also to the fourth sub-pixel 49W of the pixel 48 based on the W (white)-component. Specifically, the signal processing unit 20 can cause light with wavelengths including RGB wavelengths to be transmitted, and can cause light to be transmitted from the fourth sub-pixel 49W having the highest light transmission rate. This can improve the transmission rate of the color filter 36 in its entirety, and therefore even when the amount of light output from the planar light-source device 50 is decreased, the amount of light passing through the color filter 36 can be maintained. Accordingly, power consumption of the planar light-source device 50 can be reduced, while maintaining the luminance of an image.

It suffices that the functions of the linear conversion circuit 22, the color conversion circuit 23, the W-generation circuit 24, and the γ-correction circuit 25 are realized by either hardware or software, which is not particularly limited to one or the other. Even when each of the circuits in the signal processing unit 20 is configured by hardware, it is not necessary to physically separate these circuits from each other. Multiple functions can be realized by a physically single circuit.

Figure 5:
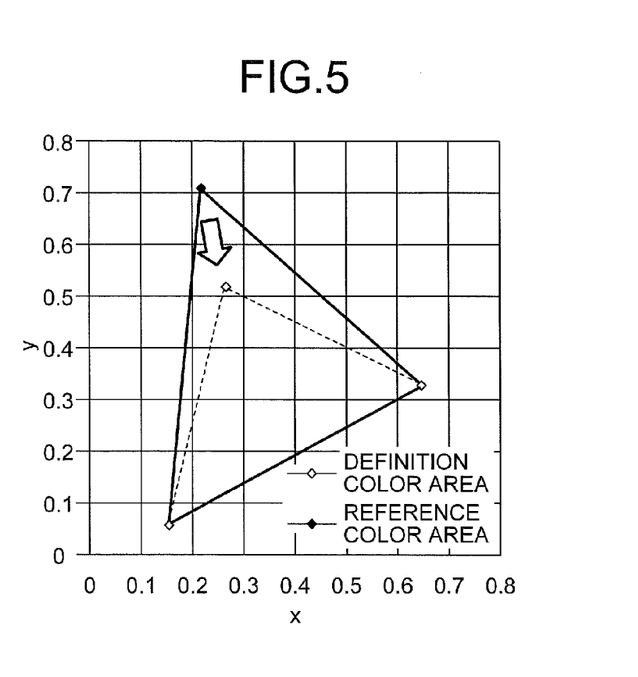
FIG. 5 is a diagram illustrating an example of a definition color area in an XYZ color system.
Figure 6:
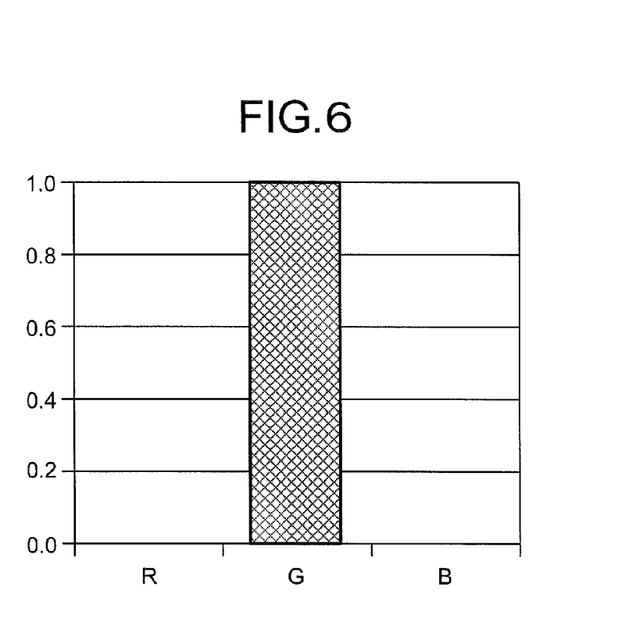
FIG. 6 is a diagram illustrating an example of an output ratio of sub-pixels before conversion.
Figure 7:
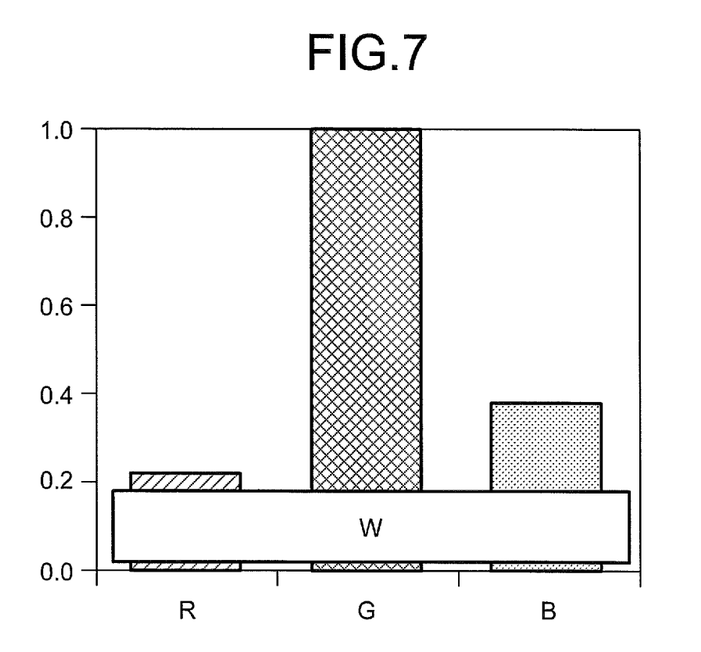
FIG. 7 is a diagram illustrating an example of an output ratio of sub-pixels after conversion.

Next, processing performed by the color conversion circuit 23 is explained. FIG. 5 is a diagram illustrating an example of a definition color area in an XYZ color system. FIG. 6 is a diagram illustrating an example of an output ratio of sub-pixels before conversion. FIG. 7 is a diagram illustrating an example of an output ratio of sub-pixels after conversion. FIG. 5 illustrates a color area of an image signal in the XYZ color system, in which the vertical axis is the y-axis, and the horizontal axis is the x-axis. The XYZ color system is a color representation form that enables all colors that are recognizable by the naked eye to be represented by positive numbers (X, Y, and Z). x+y+z=1 holds for x=X/(X+Y+Z), y=Y/(X+Y+Z), and z=Z/(X+Y+Z), where x, y, and z represent the ratio of X, Y, and Z relative to the sum of X, Y, and Z, respectively. At this time, there is a relationship expressed as z=1−x−y, and therefore x and y are decided, and then z is obtained. Accordingly, it is possible to represent all colors only by using x and y.

In the graph illustrated in FIG. 5, a reference color area is an area that represents RGB of an input signal and that can be represented by adjusting the RGB balance by the image display unit 30. In the reference color area, colors included on a peripheral line and included inside of the peripheral line can be represented. In the reference color area, a color defined by a point on the peripheral line can be represented without using at least one of three RGB colors. In the reference color area, the hue of a color changes along the peripheral line, and a difference in output balance between the three RGB colors becomes smaller as directed toward the center of an xy chromaticity range, and therefore the color approaches white. The reference color area has a triangular shape, in which its apexes are a color extended by only R, a color represented by only G, and a color represented by only B.

The color conversion circuit 23 according to the embodiment converts an input signal in the reference color area into a converted input signal in the definition color area. The definition color area is a color area that is included in the reference color area and that is narrower than the reference color area. The definition color area according to the embodiment is a triangle in which the G-chromaticity point is inside of the reference color area. That is, the definition color area is a color area where the apex position of the chromaticity point represented by only G is moved within a color area included in the reference color area in a direction to narrow the color area relative to the reference color area.

Based on the relationship illustrated in FIG. 5, the color conversion circuit 23 converts an input signal included in the reference color area into a converted input signal in the definition color area, and therefore can convert a color with a high ratio of the G amount and a low ratio of the R and B amounts in the RGB balance into a color with a relatively higher ratio of the R and B amounts. The color conversion circuit 23 converts an input signal included in the reference color area that is also a color area that can be represented by adjusting the RGB balance by the image display unit 30 into a converted input signal included in the definition color area that is narrower than the color area that can be represented by adjusting the RGB balance by the image display unit 30. In a case where the converted input signal is reproduced in the reference color area, the converted input signal includes an R-output and a B-output at a given ratio or higher. Therefore, in the embodiment, an input signal with a small output of at least one of R and B among RGB can be converted into a reproduction input signal with a relatively larger output of at least one of R and B. Specifically, assuming that each of output values of RGB colors is between 0 and 1, an input signal in which the value of a G-output is 1 and the values of an R-output and a B-output are 0, as illustrated in FIG. 6, can be converted into a converted input signal in which the values of the R-output and the B-output also become larger than 0 as illustrated in FIG. 7. Therefore, a part of the outputs of the RGB colors can be converted into a W-output as illustrated in FIG. 7, and it is possible to efficiently utilize light that is output from a planar light-source device.

Figure 8:
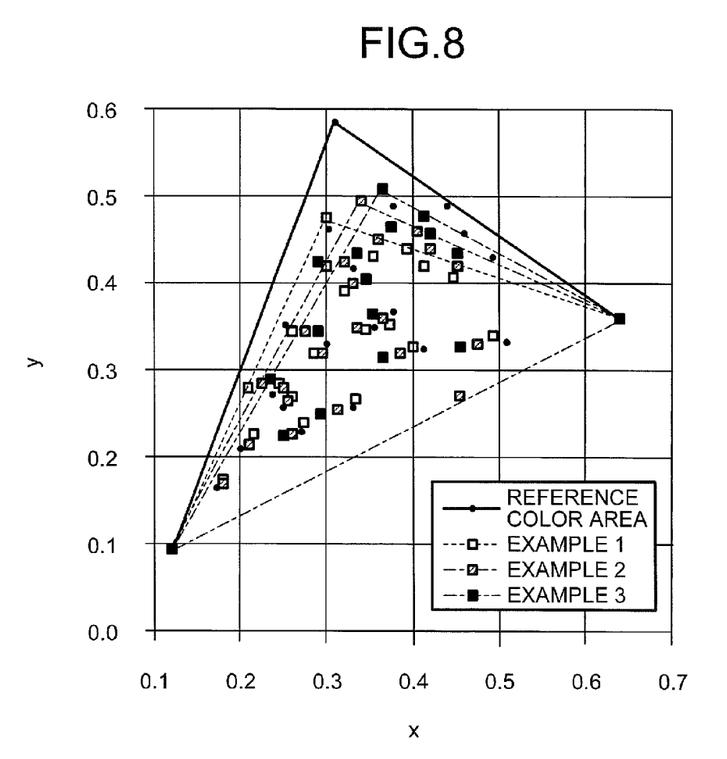
FIG. 8 is an explanatory diagram illustrating an example of a result of converting a color area.
Figure 9:
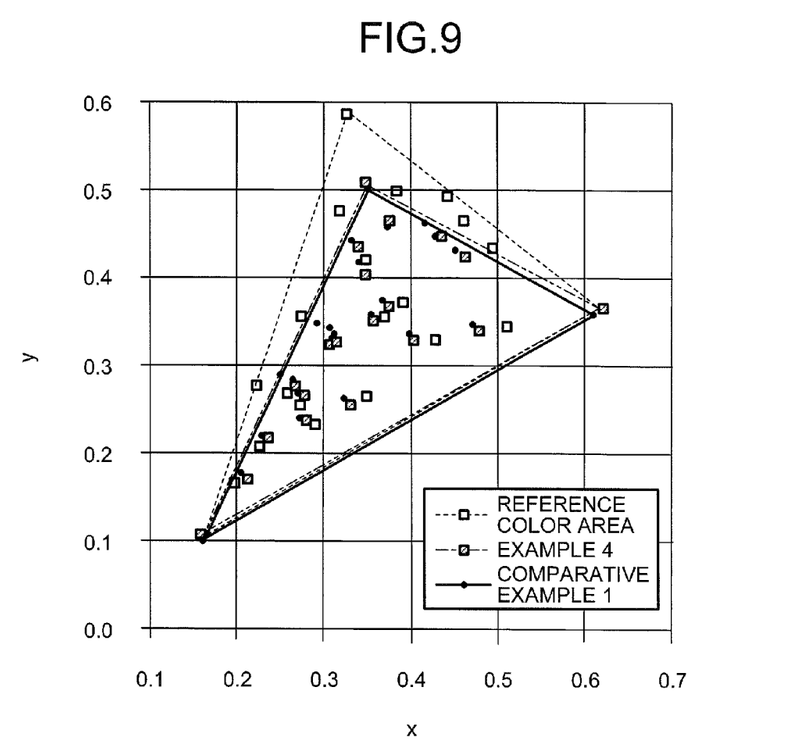
FIG. 9 is another explanatory diagram illustrating an example of a result of converting a color area.

Next, an evaluation result obtained when color conversion was performed is explained with reference to FIGS. 8 and 9. FIGS. 8 and 9 are explanatory diagrams illustrating an example of a result of converting a color area. First, the shape of the definition color area was changed to perform color conversion in different definition color areas. Specifically, input signals of various components in the reference color area were converted into converted input signals in the respective definition color areas to compare the positions of the chromaticity points of the respective signals with each other. In the embodiment, definition color areas in examples 1 to 3 were used to respectively perform color conversion on the input signals in the reference color area. FIG. 8 illustrates a result of the conversion. The reference color area is a color are having NTSC ratio of 60%. Each of the definition color areas in the examples 1 to 3 is a color area having NTSC ratio of 45%. The definition color areas in the examples 1 to 3 have a different G-chromaticity point from each other within the color areas. The red component is smaller and the blue component is larger in the example 2 than those in the example 1, and the red component is smaller and the blue component is larger in the example 3 than those in the example 2. As illustrated in FIG. 8, a difference between an input signal and a converted input signal in which a color has been converted was the displacement of the chromaticity point to an extent that does not cause any practical problems. Therefore, a displayed image does not change significantly enough to cause practical problems, and display quality degradation is suppressed to an extent that does not cause any practical problems. At any position of the G-chromaticity point, a decrease in saturation of a displayed image is suppressed to an extent that does not cause any practical problems, and display quality degradation is also suppressed. It is also understood that a converted chromaticity point is adjustable by adjusting the G-chromaticity point.

Next, as an example 4, similarly to the above examples, the reference color area was set to a color area whose NTSC ratio is 60%, and the definition color area was set to a color area whose NTSC ratio is 45% to perform color conversion. FIG. 9 illustrates the result of the conversion. As a comparative example 1, the chromaticity points of respective signals when the same image is displayed by a display device with a display capability whose NTSC ratio is 45% are illustrated. As illustrated in FIG. 9, it is understood that converted input signals in the example 4 are approximate to the signals displayed by the display device with the same performance. Also from this point, it is understood that degradation of the display quality of a displayed image is suppressed.

Next, power consumption was compared between a case where an image was displayed by the liquid-crystal display device 10 according to the embodiment and a case where an image was output by processing an input signal in the reference color area by a W-generation circuit. Specifically, electric power to be reduced by using a white sub-pixel was compared with a case where an input signal is displayed by three RGB colors. The reference color area was set to a color area whose NTSC ratio is 60%, and the definition color area was set to a color area whose NTSC ratio is 45%. In this example, at the time of processing in the W-generation circuit, the ratio of conversion into white relative to the RGB balance, that is the ratio of conversion from a smallest-output component among the RGB into the W-component, was changed at four stages. The ratio of the W-component to be replaced was made low at the first stage, and was made higher as the stage advanced to the second stage, the third stage, and the fourth stage.

As a result, at the first stage, when an image was output by processing an input signal in the reference color area by the W-generation circuit, power consumption was reduced by 23.2%. In contrast thereto, when the image was displayed by the liquid-crystal display device 10 according to the embodiment, power consumption was reduced by 33.2%. That is, at the first stage, power consumption was reduced by 10.0%. At the second stage, when an image was output by processing an input signal in the reference color area by the W-generation circuit, power consumption was reduced by 28.6%. In contrast thereto, when the image was displayed by the liquid-crystal display device 10 according to the embodiment, power consumption was reduced by 38.8%. That is, at the second stage, power consumption was reduced by 10.2%. At the third stage, when an image was output by processing an input signal in the reference color area by the W-generation circuit, power consumption was reduced by 36.1%. In contrast thereto, when the image was displayed by the liquid-crystal display device 10 according to the embodiment, power consumption was reduced by 42.8%. That is, at the third stage, power consumption was reduced by 6.7%. At the fourth stage, when an image was output by processing an input signal in the reference color area by the W-generation circuit, power consumption was reduced by 37.9%. In contrast thereto, when the image was displayed by the liquid-crystal display device 10 according to the embodiment, power consumption was reduced by 43.8%. That is, at the fourth stage, power consumption was reduced by 5.9%. Therefore, it is understood that the liquid-crystal display device 10 according to the embodiment can further reduce power consumption regardless of the mode of converting an RGB signal into an RGBW signal.

As described in the embodiment, the definition color area is set to a color area where the G (green)-chromaticity point is inside of the reference color area, and therefore a change that is sensed by human eyes can be made smaller. The shape of the definition color area relative to the reference color area is not limited to the shape in which the G (green)-chromaticity point is inside of the reference color area. The definition color area can have a shape in which the R (red)-chromaticity point is inside of the reference color area, a shape in which the B (blue)-chromaticity point is inside of the reference color area, a shape in which the G-chromaticity point and the R-chromaticity point are inside of the reference color area, a shape in which the G-chromaticity point and the B-chromaticity point are inside of the reference color area, a shape in which the B-chromaticity point and the R-chromaticity point are inside of the reference color area, or a shape in which all the R-chromaticity point, the G-chromaticity point, and the B-chromaticity point are inside of the reference color area. In the definition color area, the chromaticity point of a pixel color displayed by an image display panel is moved in a direction to be inside of the chromaticity point of the corresponding color in the reference color area. In the definition color area, a peripheral side that connects pixel colors displayed by the image display panel is shorter than that in the reference color area corresponding to the inside chromaticity point.

In the embodiment, the shape of the reference color area and the definition color area falls within the range of a triangular shape. However, the shape thereof is not limited thereto, and can also be defined within the range of an arbitral shape such as a polygonal shape, a circular shape, and an elliptical shape.

2. Application Example

Configuration of Electronic Apparatus 200

Figure 10:
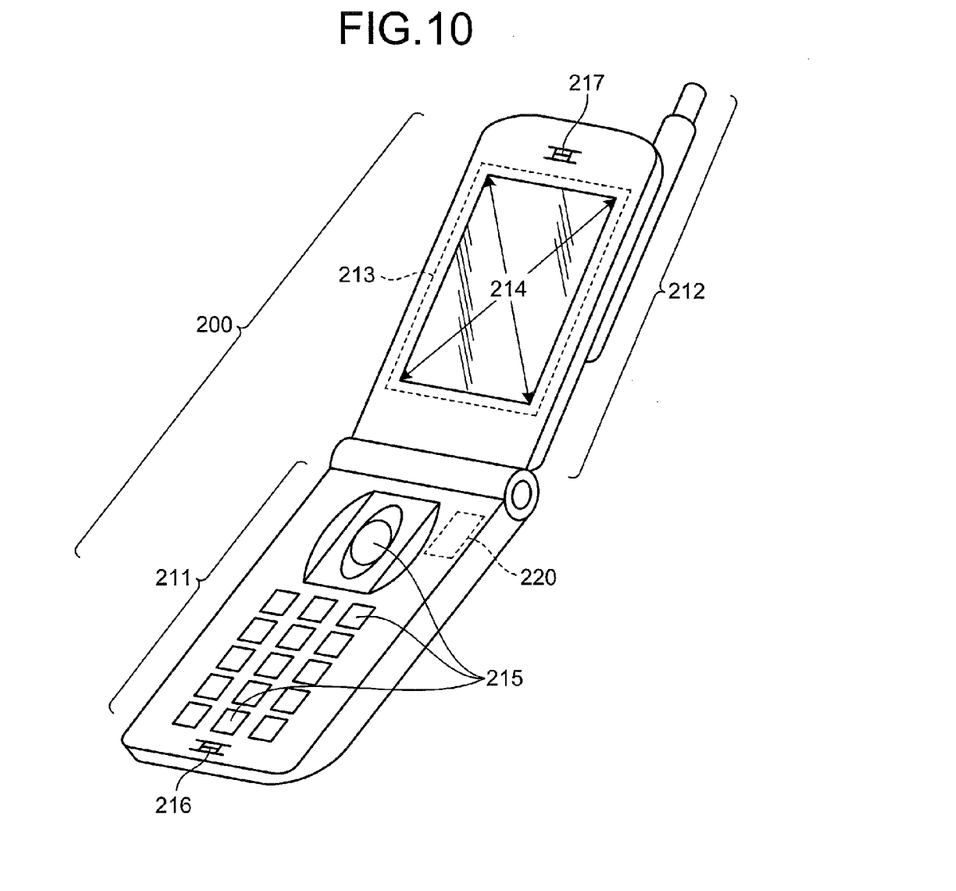
FIG. 10 is a perspective view of a configuration example of an electronic apparatus according to an application example.

FIG. 10 is a perspective view of a configuration example of an electronic apparatus according to an application example. FIG. 10 illustrates a portable phone as an example of an electronic apparatus 200. With reference to FIG. 10, a configuration of the electronic apparatus 200 according to the embodiment is explained.

As described above, the electronic apparatus 200 is a portable phone, and includes a main unit 211 and a display body 212 that is provided to be capable of being opened from and closed to the main unit 211 as illustrated in FIG. 10. The main unit 211 includes an operation button 215, a transmitter 216, and a control device 220. The display body 212 includes a liquid-crystal display device 213 and a receiver 217. The liquid-crystal display device 213 displays various information regarding telephone communication on a display screen 214 of the liquid-crystal display device 213. The liquid-crystal display device 213 is configured by the liquid-crystal display device 10 according to the above embodiment. The operation button 215 is operated by a user to transmit an operation signal to the control device 220.

Based on the operation signal and the like received from the operation button 215, the control device 220 decides an image to be displayed on the display screen 214 of the liquid-crystal display device 213, and transmits RGB data of the decided image to the liquid-crystal display device 213 as an input signal.

The liquid-crystal display device 213 performs the linear conversion, the color conversion processing, the W-generation processing, and the γ-correction that have been described in detail in the above embodiment on the input signal received from the control device 220. Based on the RGB input signal having undergone each processing, the liquid-crystal display device 213 generates an RGBW output signal and a light-source-device control signal. Based on the output signal and the light-source-device control signal, the liquid-crystal display device 213 displays an image on the display screen 214.

A configuration may be employed, in which whether the liquid-crystal display device 213 performs the color conversion processing on the input signal received from the control device 220 is selectable based on setting information held in the control device 220. A configuration can also be employed, in which the control device 220 holds therein a plurality of definition color areas for performing the color conversion processing, which are appropriately selectable. With these configurations, whether the color conversion processing is performed is selected according to the environment of the electronic apparatus 200, and when the color conversion processing is performed, an appropriate definition color area can be selected among the definition color areas.

As described above, the liquid-crystal display device 213 in the electronic apparatus 200 is configured by the liquid-crystal display device 10 according to the above embodiment. Therefore, a decrease in saturation of an image can be suppressed to an extent that does not cause any practical problems, and power consumption can be reduced.

Examples of the electronic apparatus 200 according to the present embodiment, to which the liquid-crystal display device 10 according to the above embodiment is applicable, include a clock with a display device, a watch with a display device, a personal computer, a liquid crystal television, a viewfinder-type or monitor direct-view-type videotape recorder, a car navigation device, a pager, an electronic organizer, a calculator, a word processor, a workstation, a videophone, and a POS terminal device, in addition to the portable phone described above.

The embodiments of the present disclosure are not limited by the foregoing descriptions. Further, the components in the above described embodiments include components easily conceivable by those skilled in the art and components substantially identical, in other words, components that are within the range of equivalency. Moreover, various omissions, alternatives and variations of the components may be possible within the scope of the above embodiment.

3. Aspects of the Present Disclosure

The present disclosure includes the following aspects.
(1) A display device comprising:
an image display panel in which pixels are arrayed in a two-dimensional matrix, where each of the pixels includes a first sub-pixel that displays a first color, a second sub-pixel that displays a second color, a third sub-pixel that displays a third color, and a fourth sub-pixel that displays white;
a color conversion device that includes a signal processing unit that generates an output signal for controlling an operation of a pixel of a display unit based on an input signal generated in a reference color area, and a signal output unit that outputs a drive signal of the pixel to the image display panel based on the output signal generated by the signal processing unit;
a planar light-source device that is arranged at a backside of the display unit at an opposite side to an image display surface thereof, and that emits white light toward a substantially entire surface of the display unit; and
a light-source-device control unit that controls the planar light-source device, wherein
the signal processing unit includes a color conversion circuit that converts the input signal in the reference color area into a converted input signal generated in a definition color area where a chromaticity point of at least one of the first color, the second color, and the third color is inside of the reference color area, and a four-color generation circuit that generates the output signal and a light-source-device control signal from the converted input signal converted by the color conversion circuit,
the signal output unit outputs the drive signal to the first sub-pixel, the second sub-pixel, the third sub-pixel, and the fourth sub-pixel based on the output signal generated by the four-color generation circuit, and
the light-source-device control unit outputs a drive voltage for emitting the white light on the planar light-source device based on the light-source-device control signal generated by the four-color generation circuit.
(2) The display device according to claim 1, wherein the first color is red, the second color is blue, and the third color is green.
(3) The display device according to claim 2, wherein in the definition color area, a chromaticity point of the third color is inside of the reference color area.
(4) An electronic apparatus comprising:
the display device according to (1); and
a control device that transmits the input signal for displaying an image to the display device.

According to the display device and the electronic apparatus of the present disclosure, at least one color area in a color extended space can be narrowed to reduce power consumption, while suppressing a decrease in saturation to an extent that does not cause any practical problems.

What is claimed is:
1. A display device comprising:
an image display panel in which pixels are arrayed in a two-dimensional matrix, where each of the pixels includes a first sub-pixel that displays a first color, a second sub-pixel that displays a second color, a third sub-pixel that displays a third color, and a fourth sub-pixel that displays white;
a color conversion device that includes a signal processing unit that generates an output signal for controlling an operation of a pixel of a display unit based on an input signal generated in a reference color area, and a signal output unit that outputs a drive signal of the pixel to the image display panel based on the output signal generated by the signal processing unit;
a planar light-source device that is arranged at a backside of the display unit at an opposite side to an image display surface thereof, and that emits white light toward a substantially entire surface of the display unit; and
a light-source-device control unit that controls the planar light-source device, wherein
the signal processing unit includes a color conversion circuit that converts the input signal in the reference color area into a converted input signal generated in a definition color area where a chromaticity point of at least one of the first color, the second color, and the third color is inside of the reference color area, and a four-color generation circuit that generates the output signal and a tight-source-device control signal from the converted input signal converted by the color conversion circuit,
the signal output unit outputs the drive signal to the first sub-pixel, the second sub-pixel, the third sub-pixel, and the fourth sub-pixel based on the output signal generated by the four-color generation circuit,
the light-source-device control unit outputs a drive voltage for emitting the white light on the planar light-source device based on the light-source-device control signal generated by the four-color generation circuit, and
such that the definition color area is narrower than and within the reference color area.
2. The display device according to claim 1, wherein the first color is red, the second color is blue, and the third color is green.
3. The display device according to claim 2, wherein in the definition color area, a chromaticity point of the third color is inside of the reference color area.
4. An electronic apparatus comprising:
the display device according to claim 1; and
a control device that transmits the input signal for displaying an image to the display device.

* * * * *